(12) United States Patent
Glikis et al.

(10) Patent No.: US 8,733,747 B2
(45) Date of Patent: May 27, 2014

(54) GLASS INSTALLATION TOOL WITH MAGNET FOR REMOVABLE ATTACHMENT TO FRAME

(75) Inventors: Harry J. Glikis, Dearborn, MI (US); Cheryl A. Discher, New Baltimore, MI (US); Renee G. Dicicco, Rochester Hills, MI (US); Deborah L Froehlich, Clarkston, MI (US); Giurgevca Palincas, Chesterfield, MI (US); Keith Windmill, Shelby, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/369,402

(22) Filed: Feb. 9, 2012

(65) Prior Publication Data

US 2013/0205578 A1 Aug. 15, 2013

(51) Int. Cl.
*B25B 11/00* (2006.01)
*B25B 5/14* (2006.01)
*B25B 27/14* (2006.01)

(52) U.S. Cl.
USPC ............. 269/8; 269/104; 29/281.5; 29/281.1; 29/468

(58) Field of Classification Search
USPC ................. 269/8, 902; 29/276, 257
See application file for complete search history.

(56) References Cited

U.S. PATENT DOCUMENTS

| | | | |
|---|---|---|---|
| 3,620,524 A | 11/1971 | Czompi | |
| 4,659,138 A | 4/1987 | Gosse et al. | |
| 4,719,736 A | 1/1988 | Aho et al. | |
| 4,912,895 A | 4/1990 | Harris, Jr. | |
| 4,998,711 A | 3/1991 | Borg | |
| 5,152,576 A | 10/1992 | Ris | |
| 5,214,824 A * | 6/1993 | Lesser et al. | 16/225 |
| 5,308,135 A | 5/1994 | Stedman | |
| 5,310,240 A | 5/1994 | Andre et al. | |
| 5,343,662 A | 9/1994 | Nelson | |
| 5,380,978 A * | 1/1995 | Pryor | 219/121.64 |
| 5,531,496 A | 7/1996 | Zbinden et al. | |
| 5,639,134 A | 6/1997 | Rusch et al. | |

(Continued)

FOREIGN PATENT DOCUMENTS

DE 4105023 C1 7/1992
DE 4302662 A1 8/1994

(Continued)

OTHER PUBLICATIONS

Machine Translation of EP1008474A3 by Willibald Kraus Oct. 15, 1999.*

(Continued)

*Primary Examiner* — Lee D Wilson
*Assistant Examiner* — Nirvana Deonauth
(74) *Attorney, Agent, or Firm* — Ralph E Smith (57) ABSTRACT

An installation system for attaching a transparent pane to a frame includes at least one support tool having a base member and a support member. The support member is operably coupled to the base member, and the support member is operable to support the pane in a fixed position relative to the frame. The support tool also includes a magnet that is fixed to at least one of the base member and the support member for magnetically and removably attaching the at least one support tool to the frame. A method of attaching the pane to the frame is also disclosed.

17 Claims, 5 Drawing Sheets

(56) References Cited

U.S. PATENT DOCUMENTS

| | | | |
|---|---|---|---|
| 5,956,833 A | 9/1999 | Davis et al. | |
| 5,971,379 A * | 10/1999 | Leon, Jr. | 269/8 |
| 6,099,063 A | 8/2000 | Rohagti | |
| 6,151,847 A | 11/2000 | Okuniewicz et al. | |
| 7,610,666 B2 | 11/2009 | Adas et al. | |
| 2006/0143891 A1 * | 7/2006 | Reesing | 29/281.5 |
| 2007/0089375 A1 | 4/2007 | Helner et al. | |
| 2009/0229116 A1 | 9/2009 | Roach et al. | |
| 2010/0264188 A1 * | 10/2010 | Carlsson et al. | 224/576 |

FOREIGN PATENT DOCUMENTS

| | | | |
|---|---|---|---|
| EP | 0230837 | A1 | 8/1987 |
| EP | 1008474 | A2 | 6/2000 |
| FR | 2758786 | A1 | 7/1998 |
| FR | 2920402 | A1 | 3/2009 |

OTHER PUBLICATIONS

Machine Translation of EP0230837B1 by Bernard Massie Dec. 13, 1989.*

International Search Report dated May 23, 2013 for International Appln No. PCT/US2013/025322, International Filing Date Feb. 8, 2013.

Written Opinion dated May 23, 2013 for International Appln No. PCT/US2013/025322, International Filing Date Feb. 8, 2013.

* cited by examiner

GLASS INSTALLATION TOOL WITH MAGNET FOR REMOVABLE ATTACHMENT TO FRAME

FIELD

The present disclosure relates to a glass installation tool and, more particularly, to a glass installation tool that has at least one magnet for removably attaching the tool to a frame.

BACKGROUND

Glass or other transparent panes of material are often attached to structures to allow objects to be viewed through one or both sides of the structure. The structure often includes a frame, which supports and attaches to one or more edges of the pane. For instance, vehicles include rear windows (backlite panes), quarter glass, windshields, and other panes that attach to frames defined within the vehicle body.

The pane can be attached to the frame in many different ways. In some cases, pins or other fasteners are attached to the pane, and the fasteners are attached within corresponding holes, etc. formed within the frame. Also, in some cases, the pane is attached using an adhesive that continuously extends about the periphery of the pane.

SUMMARY

An installation system for attaching a transparent pane to a frame is disclosed. The system includes at least one support tool having a base member and a support member. The support member is operably coupled to the base member, and the support member is operable to support the pane in a fixed position relative to the frame. The support tool also includes a magnet that is fixed to at least one of the base member and the support member for magnetically and removably attaching the at least one support tool to the frame.

A method of attaching a transparent pane to a frame is also disclosed. The method includes providing at least one support tool having a base member, a support member that is operably coupled to the base member, and a magnet that is fixed to at least one of the base member and the support member. The method further includes magnetically and removably attaching the at least one support tool to the frame via the magnet. Also, the method includes supporting the pane on the support member in a fixed position relative to the frame with the at least one support tool magnetically attached to the frame.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Referring initially to FIGS. 1-6, an installation system 10 is illustrated according to various exemplary embodiments of the present disclosure. The installation system 10 can be used for attaching a transparent pane 12 of material to a frame 14. It will be appreciated that the installation system 10 can be implemented in manual installation operations or automatic (e.g., robotic) installation of the pane 12.

The pane 12 could be of any suitable material, such as tempered glass, laminate glass, a polymeric pane of material, etc. The pane 12 can be of any suitable shape as well. For instance, the pane 12 can include a substantially rectangular peripheral edge 13, a substantially flat inner surface 15, and a substantially flat outer surface 17. Also, the frame 14 can be defined in any suitable object. For instance, the frame 14 can be an opening defined within a vehicle body (e.g., formed from or within sheet metal of the vehicle body). In the exemplary embodiments illustrated in FIGS. 1-6, the system 10 is used to fixedly attach a pane 12 of quarterglass into the frame 14 of a vehicle, such as a Sports Utility Vehicle (SUV).

Figure 1:
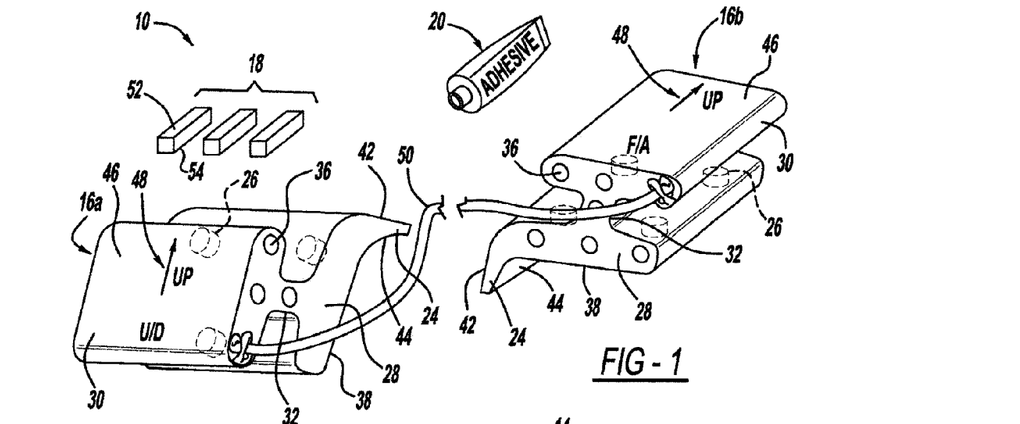
FIG. 1 is a perspective view of a system for installing a transparent pane of material to a frame according to various exemplary embodiments of the present disclosure.

As shown in FIG. 1, the system 10 generally includes one or more support tools 16a, 16b, a plurality of shim members 18, and an adhesive 20. As will be discussed, a bead 22 of the adhesive 20 can be used to fix the pane 12 to the frame 14 and to form a substantially watertight seal therebetween. During installation of the pane 12, the support tools 16a, 16b and the shim members 18 can help to guide the pane 12 toward the frame 14 such that the pane 12 is guided toward a target position relative to the frame 14. Then, once the pane 12 is positioned in the frame 14, the support tools 16a, 16b and the shim members 18 can cooperatively support the pane 12 in the fixed position (i.e., in the target position) relative to the frame 14 while the bead 22 of adhesive 20 cures.

More specifically, the shim members 18 can be spaced apart across the pane 12 to be disposed between the inner surface 15 of the pane 12 and the frame 14 (FIGS. 3, 4, and 5) to cooperatively maintain a desired space T therebetween. Also, a flange 24 or other support member of the support tool 16a, 16b can be disposed between the peripheral edge 13 of the pane 12 and the frame 14 to further support the pane 12 in the desired fixed position relative to the frame 14. Thus, the support tools 16a, 16b and shim members 18 can cooperatively support the pane 12 in the desired position relative to the frame 14 (e.g., to limit sagging or drifting of the pane 12 as the adhesive 20 cures).

Figure 2:
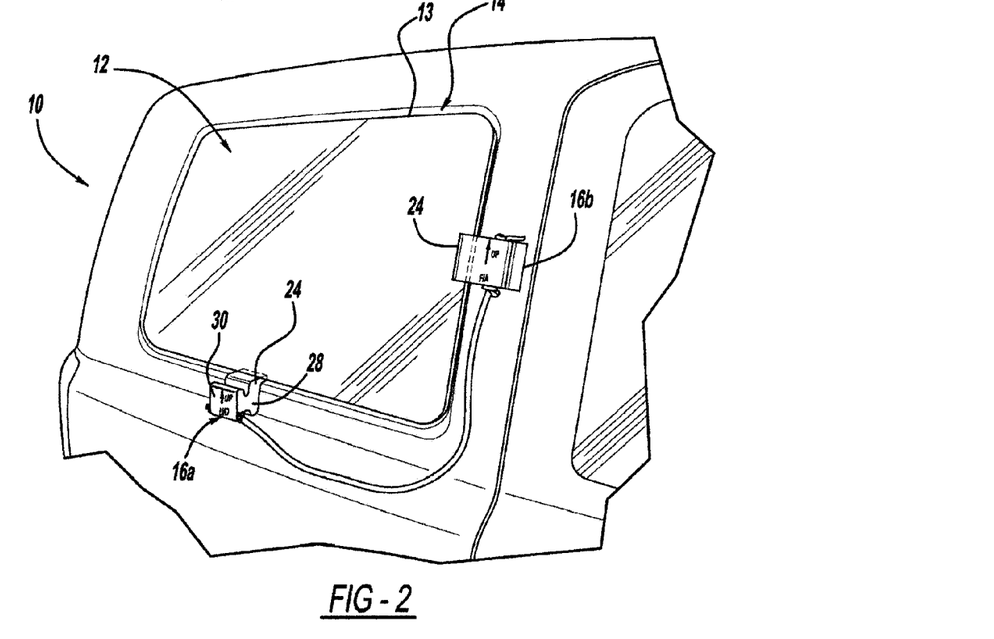
FIG. 2 is a perspective view of a pane of transparent material being installed into a frame using the system of FIG. 1.
Figure 3:
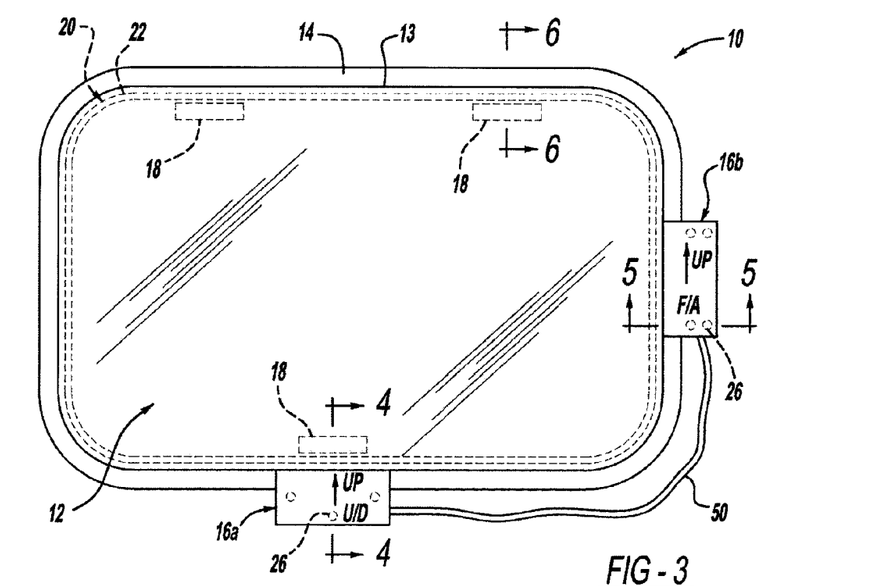
FIG. 3 is a plan view of the pane of transparent material being installed into a frame using the system of FIG. 1.

As shown in FIGS. 2 and 3, the support tools 16a, 16b and the shim members 18 can cooperate to support the pane 12 in three orthogonal directions. Specifically, in the exemplary embodiments of FIGS. 2-5, the support tool 16a can support the pane 12 in a first direction (i.e., the vertical direction), the support tool 16b can support the pane 12 in a second direction (i.e., the fore-aft direction), and the shim members 18 can support the pane 12 in a third direction (i.e., the inboard-outboard direction). Thus, the installation system 10 can help to ensure that the pane 12 is positioned as desired.

In some embodiments, the shim members 18 can remain in position after the adhesive 20 cures, but the support tools 16a, 16b can be removed once the adhesive 20 cures. To this end, the support tools 16a, 16b can include one or more magnets 26 that allow the support tools 16a, 16b to be removably attached to the frame 14 as will be discussed in greater detail below. It will be appreciated, however, that the support tools 16a, 16b could include other implements other than the magnets 26 for removably attaching to the frame 14.

Referring now to FIGS. 1-6, the support tools 16a, 16b will be discussed in greater detail. It will also be appreciated that the shape, size, and other characteristics of the support tools 16a, 16b can be slightly different from each other, or the tools 16a, 16b can be substantially the same.

The support tools 16a, 16b can include a base member 28, a handle member 30, a beam 32, and a flange 24, which are integrally connected so as to be monolithic. The base member 28, handle member 30, beam 32, and flange 24 can be made out of any suitable material, such as nylon. As such, the support tools 16a, 16b can be relatively lightweight, portable, and durable.

Figure 4:
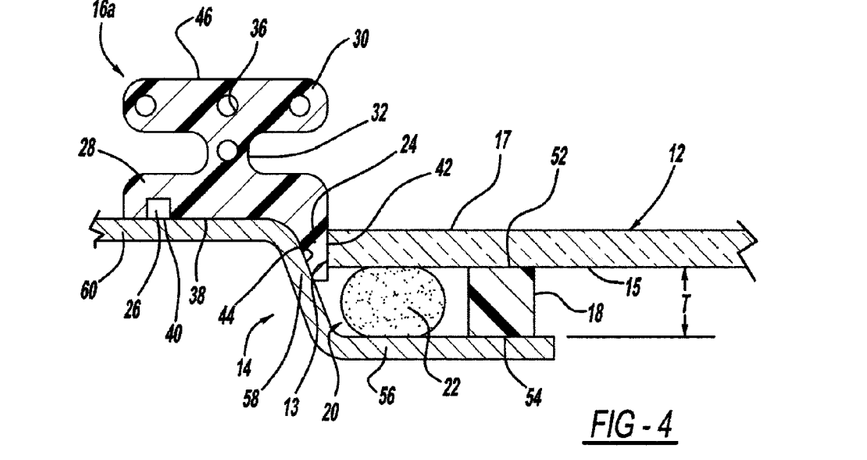
FIG. 4 is a section view of the system taken along line 4-4 of FIG. 3.
Figure 5:
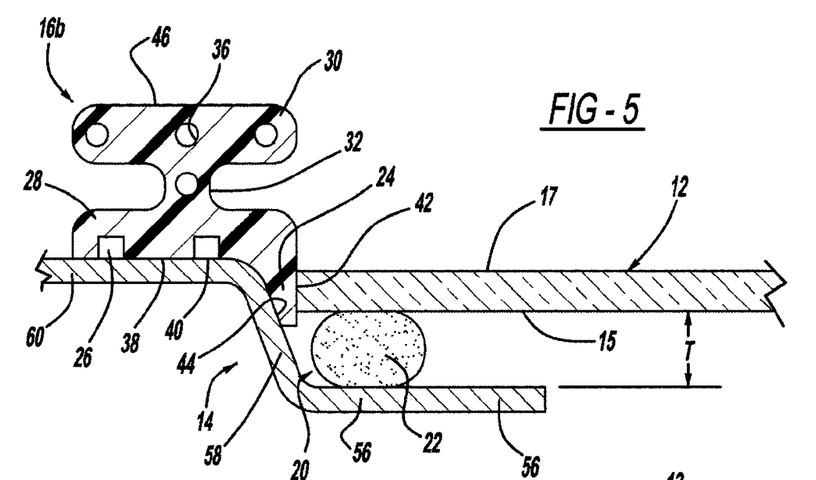
FIG. 5 is a section view of the system taken along line 5-5 of FIG. 3.

The base member 28 can be generally box-shaped and can include a frame abutting surface 38, which is operable to abut against the frame 14 (FIGS. 4 and 5). The frame abutting surface 38 can be substantially flat such that the surface 38 can lie substantially flat over the frame 14. However, the frame abutting surface 38 can have any suitable shape, and in some embodiments, the frame abutting surface 38 can be shaped according to that of the frame 14.

The flange 24 can be attached to the base member 28 such that the flange 24 and base member 28 together have an L-shaped cross section. The flange 24 can extend away at an obtuse angle from the base member 28 such that the flange 24 and base member 28 can both substantially conform and mate to the frame 14 as will be discussed. As shown in FIGS. 4 and 5, the flange 24 can be slightly tapered such that the width of the flange 24 in cross section gradually reduces in a direction moving away from the base member 28.

The flange 24 can define a pane abutting surface 42 operable to abut against the peripheral edge 13 of the pane 12 and a frame abutting surface 44 operable to abut against the frame 14. The surfaces 42, 44 are disposed on opposite sides of the flange 24 and can be substantially flat such that the surfaces 42, 44 can lie substantially flat over the pane 12 and frame 14, respectively. However, the surfaces 42, 44 can be shaped according to that of the pane 12 and frame 14, respectively. It will also be appreciated that the support tools 16a, 16b can include another type of support member other than the flange 24. For instance, the support member of the support tools 16a, 16b could be a cylindrical rod or other projection that extends from the base member 28 for supporting the pane 12 in the frame 14.

The handle member 30 can be generally box-shaped. The handle member 30 can include an outer surface 46 that includes a marking 48. In the embodiments shown, the marking 48 on the tool 16a includes an arrow and the lettering "UP" and "U/D" whereas the marking 48 on the tool 16b includes an arrow and the lettering "UP" and "F/A". The markings 48 can help indicate to the user how to orient the tools 16a, 16b on the frame 14 as will be discussed.

The beam 32 can be connected at each end to the handle member 30 and the base member 28 such that the handle member 30 and the base member 28 are spaced apart. In the embodiments illustrated, the beam 32 can be substantially centered on both the handle member 30 and the base member 28.

Furthermore, the support tools 16a, 16b can include one or more weight reduction holes 36. The holes 36 can extend through the base member 28, the handle member 30, the beam 32, and/or the flange 24 to thereby reduce the weight of the tool 16a, 16b and help reduce weight loads on the magnets 26 when attached to the frame 14 as will be discussed.

The magnets 26 can be attached to any appropriate portion of the respective support tools 16a, 16b. For instance, in the embodiments illustrated, the support tool 16a includes three disc-shaped magnets 26 that are substantially embedded in the base member 28 (i.e., spaced away from the flange 24), and the support tool 16b includes four disc-shaped magnets 26 that are substantially embedded in the base member 28 (i.e., spaced away from the flange 24). However, there can be any number of magnets 26, and the magnets 26 can be located on the flange 24 or other portions of the tool 16a, 16b. Also, the magnets 26 can be permanent magnets which can magnetically attract to the ferromagnetic (metallic) material of the frame 14. In other embodiments, the magnets 26 can be electromagnets.

The magnets 26 can be disposed closely adjacent the frame abutting surface 38. In some embodiments, the frame abutting surface 38 can include openings 40 that expose the magnets 26 through the frame abutting surface 38. The magnets 26 can be press fit or interference fit through the openings 40 in order to attach the magnets 26 to the respective tool 16a, 16b. In other embodiments, the magnets 26 are completely enclosed within the respective tool 16a, 16b. Also, in some embodiments, the magnets 26 are recessed toward the interior of the tool 16a, 16b (i.e., recessed away from the frame abutting surface 38) such that the magnets 26 are unlikely to contact or scratch the frame 14 during use.

Moreover, the tools 16a, 16b can be operably connected by a connection member 50. The connection member 50 can be a flexible rope, line, chain, or other type. The connection member 50 can be threaded through respective holes 36 in the tools 16a, 16b. The connection member 50 can also be knotted in order to keep the tools 16a, 16b retained at the respective ends of the connection member 50. The connection member 50 can be useful for keeping the tools 16a, 16b together for use as a pair.

Referring now to FIGS. 1, 3, 4, and 6, the shim members 18 will be discussed in greater detail. The shim members 18 can be elongate and can have a rectangular cross section. The shim members 18 can be made out of any suitable material, such as foam that is substantially rigid under compression. The shim members 18 can include a pane abutting surface 52 that is operable to abut against the inner surface 15 of the pane 12 and a frame abutting surface 54 that is operable to abut against the frame 14. The thickness T between the surfaces 52, 54 (FIGS. 4 and 6) can be adapted according to a desired target thickness of the bead 22 (i.e., the thickness of the bead 22 once partially compressed and cured). In some embodiments, the thickness T of the shim members 18 is approximately six millimeters, the width of the shim members 18 can be approximately six millimeters, and the length of the shim members 18 can be approximately twenty-five millimeters. However, the shim members 18 can have any suitable shape and size.

In some embodiments, one or both of the surfaces 52, 54 of the shim member 18 includes an adhesive. As such, the surfaces 52, 54 can adhesively attach to the pane 12 and frame 14, respectively, by applying pressure therebetween. However, it will be appreciated that the shim members 18 can be attached in any suitable fashion.

Figure 6:
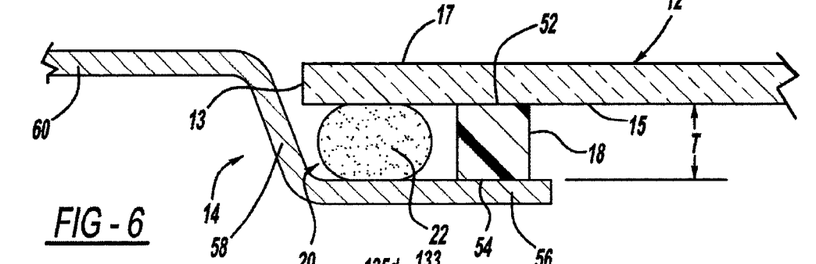
FIG. 6 is a section view of the system taken along the line 6-6 of FIG. 3.

Referring now to FIGS. 1 and 3-6, the adhesive 20 will be discussed in greater detail. The adhesive 20 can be of any suitable type. For instance, in some embodiments, the adhesive 20 can be a urethane-type adhesive. As shown in FIG. 3, the bead 22 of adhesive 20 can be applied in a continuous line adjacent the periphery 13 of the pane 12. Then, as shown in FIGS. 4-6, the bead 22 can be partially compressed to a thickness T. Once cured, the adhesive 20 can rigidly and fixedly attach the pane 12 and the frame 14 and can substantially seal the pane 12 to the frame 14.

Referring now to FIGS. 2-6, the process of attaching the pane 12 to the frame 14 will now be discussed. In the embodiments illustrated in FIGS. 4-6, the frame 14 has a substantially Z-shaped cross section so as to include a recessed surface 56, a connecting wall 58, and a surrounding surface 60. These surfaces 56, 58, 60 can be cleaned (e.g., with isopropyl alcohol or other cleaning substance) prior to installation of the pane 12. Also, at least the inner surface 15 of the pane 12 can be similarly cleaned.

Then, the frame 14 can be measured to determine the desired position for the pane 12. This measurement can be completed in a conventional fashion. It will be appreciated that, for instance, in a high volume production process, the size of the frame 14 may vary within a certain tolerances. Therefore, the measurement of the frame 14 can be performed to make sure that the pane 12 is properly positioned relative to the frame 14 (e.g., centered within the frame 14). Once measured, the frame 14 can be marked (e.g., with a metal scribing tool) to visually indicate where to place the shim members 18 and/or the support tools 16a, 16b. In additional embodiments, the frame 14 can include depressions or other indicators of where to place the shim members 18 on the frame 14 (e.g., such that measuring and marking the frame 14 is unnecessarily).

Next, the frame abutting surfaces 54 of the shim 18 members can be adhesively attached to the recessed surface 56 of the frame 14. As shown in FIG. 3, the shim members 18 can be spaced apart from each other (e.g., with two shim members 18 adjacent a common, upper edge and another shim member 18 adjacent the opposite edge). In some embodiments, three shim members 18 are used such that the pane abutting surfaces 52 of the shim members 18 lie substantially within a common plane. Moreover, in some embodiments, a sheet of protective material is left in place over the adhesive included on the pane abutting surface 52 of the shim members 18 until the pane 12 is ready to be installed.

Also, the support tools 16a, 16b can be removably (magnetically) attached to the frame 14. As shown in FIGS. 4 and 5, the curvature and profile of the frame abutting surfaces 38, 44 of the tools 16a, 16b can allow the support tools 16a, 16b to substantially conform and mate to the connecting wall 58 and the surrounding surface 60 of the frame 14. Also, as shown in FIGS. 2 and 3, the support tool 16a can be attached to a horizontal edge of the frame 14 while the support tool 16b can be attached to a vertical edge of the frame 14. The markings 48 on the tools 16a, 16b (FIG. 2) can confirm to the user that the tool 16a, 16b is attached along the intended edge of the frame 14 (e.g., if the arrow included in the markings 48 is pointing upwards).

Next, the bead 22 of adhesive 20 can be applied to the inner surface 15 of the pane 12. The pane 12 can then be moved toward the frame 14, and the pane abutting surface 42 of the tools 16a, 16b can help guide the pane 12 into the desired position relative to the frame 14. More specifically, the pane 12 can slide along the pane abutting surface 42 toward the frame 14 to move to the desired position. Once the inner surface 15 of the pane 12 contacts the pane abutting surface 52 of the shim members 18, pressure can be applied to thereby adhesively attach the pane 12 to the shim members 18. Once in this position, the bead 22 is compressed to the desired thickness T on the recessed surface 56 of the frame 14 (i.e., the shim members 18 limit compression of the bead 22 to the thickness T), and the bead 22 can begin to cure. As the bead 22 cures, the adhesive attachment to the shim members 18 can retain the pane 12 in the fixed position, and the tools 16a, 16b can be removed. The support tools 16a, 16b can be removed by pulling on the handle members 30, leaving the pane 12 and the shim members 18 in place.

In additional embodiments in which the shim members 18 do not adhesively attach to the pane 12, the shim members 18 can limit movement of the pane 12 in the inboard/outboard direction when installing the pane 12. Also, the tool 16a can support the pane 12 in the vertical direction relative to the frame 14, and the tool 16b can support the pane 12 in the fore/aft direction. Thus, the pane 12 can be properly positioned in all three orthogonal positions. The tools 16a, 16b can remain attached to the frame 14 until the bead 22 sufficiently cures, and then the tools 16a, 16b can be removed.

Accordingly, the installation system 10 can facilitate installation of the pane 12 into its intended position relative to the frame 14. The user can have a relatively clear view of the pane 12 relative to the pane abutting surfaces 42 of the tools 16a, 16b and the pane abutting surfaces 52 of the shim members 18 such that the surfaces 42, 52 can locate the pane 12 relative to the frame 14. Also, the shim members 18 can limit over-compression of the bead 22 in the inboard direction. Moreover, the installation system 10 can reduce material and manufacturing costs because pins or other fasteners are likely unnecessary for attaching the pane 12. Additionally, if several panes 12 are shipped together, the panes 12 can be packed closely together without having to include space for fasteners therebetween. Still further, the paint or other surface finish of the frame 14 is unlikely to be damaged, for instance, by attachment fasteners. In addition, the adhesive of the bead 22 is unlikely to be inadvertently spread on surfaces of the frame 14 during installation. Finally, the installation system 10 allows the pane 12 to be accurately fit and positioned relative to the frame 14, and as such, the pane 12 is unlikely to cause buzzing, rattling, squeaking, etc. while the vehicle is in motion.

Referring now to FIGS. 7-10, the installation system 110 is illustrated according to additional exemplary embodiments. Components that correspond to those of the embodiments of FIGS. 1-6 are indicated by corresponding reference numbers increased by 100.

Figure 7:
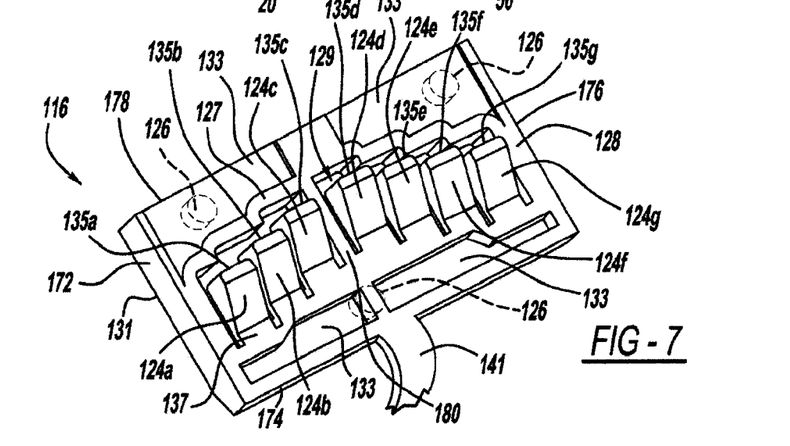
FIG. 7 is a perspective view of a support tool of the installation system according to additional exemplary embodiments of the present disclosure.
Figure 8:
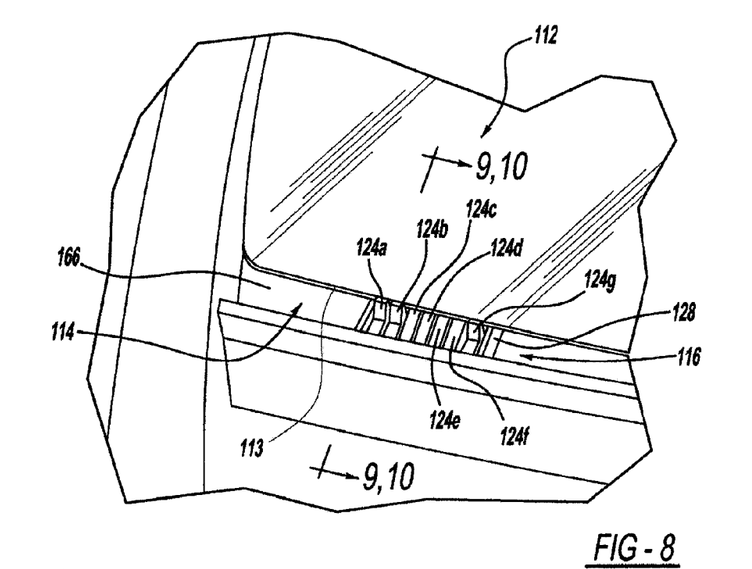
FIG. 8 is a perspective view of a pane of transparent material being installed into a frame using the support tool of FIG. 7.
Figure 9:
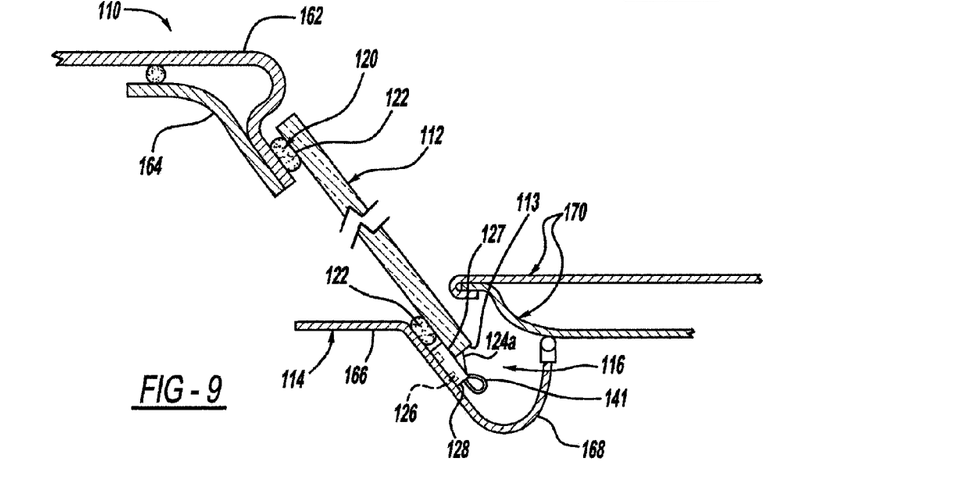
FIG. 9 is a section view of the installation system taken along the line 9-9 of FIG. 8.
Figure 10:
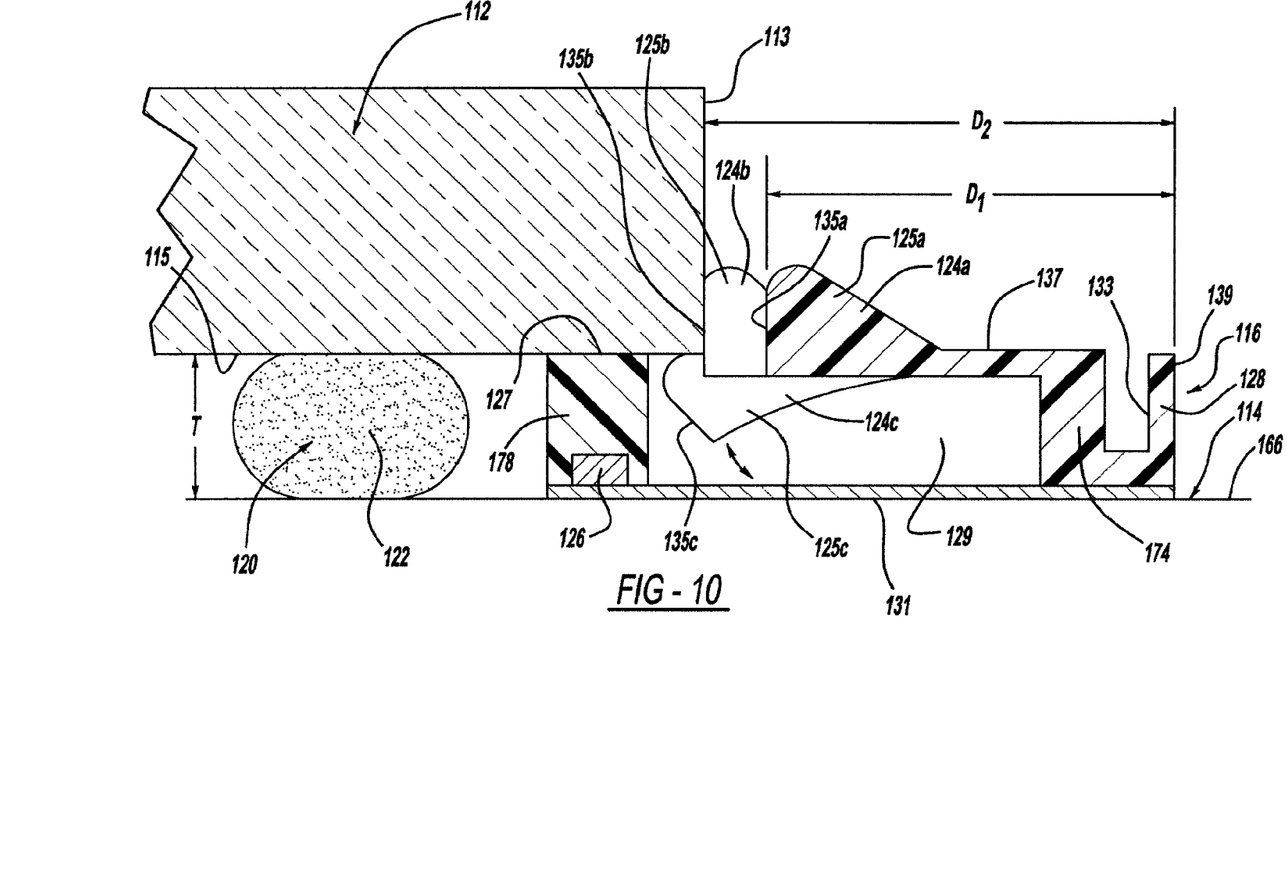
FIG. 10 is a detail, section view of the installation system taken along the line 10-10 of FIG. 8.

As shown in FIGS. 8-10, the system 110 can be used during installation of a pane 112 of backlite glass (i.e., rear window) of a vehicle. As will be discussed, the pane 112 can include a bottom peripheral edge 113 that is supported by the support tool 116 (FIG. 7) during installation. However, it will be appreciated that the system 110 can be used for installation of any appropriate pane 112 of transparent material.

Also, as shown in FIG. 9, the frame 114 can be defined between a roof 162, a rear header 164, a package tray 166, a drain trough 168, and a deck lid 170, each of which are known components of a vehicle. It will be appreciated that one or more of the roof 162, the rear header 164, the package tray 166, the drain trough 168, and a deck lid 170 can be separate components (e.g., separate pieces of sheet metal that are attached via welds, fasteners, etc.). As such, in a large volume production process, there could be wide variation of the size of the frame 114. Accordingly, the target position of the pane 112 relative to the frame 114 may vary slightly (e.g., by approximately +/−2.25 millimeters in the vertical direction along the pane 112). As will be discussed, the support tool 116 can include various features that allow the same support tool 116 to support the pane 112 regardless of its individual spatial variation relative to the frame 114. Stated differently, the support tool 116 can be modular to accommodate and support the pane 112 in a number of positions relative to the frame 114.

As shown in FIG. 7, the base member 128 can be generally box shaped and hollow so as to include a include first side wall 172, a second side wall 174, a third side wall 176, and a fourth side wall 178. The base member 128 can also include a back panel 131 (FIG. 10) that extends between and is fixed to ends of the walls 172, 174, 176, 178 to thereby cover a space 129 defined between the walls 172, 174, 176, 178. The base member 128 can also include a bracing wall 180 (FIG. 7) that extends between and is fixed at both ends to the second and fourth side walls 174, 178, respectively. Furthermore, the base member 128 can include one or more recesses 133 (FIGS. 7 and 10) thereon.

The base member 128 can further include a flexible strap 141. As shown in FIGS. 7 and 9, the strap 141 can be attached to the second side wall 174. The strap 141 can be useful for pulling, for instance, when removing the support tool 116 from the frame 114 as will be discussed.

The support tool 116 can further include one or more support members, such as fingers 124a-124g that are moveably attached to the base member 128. In the embodiments illustrated, there are seven fingers 124a-124g that are lined up in a row, each cantilevered from the second side wall 174 (FIG. 10). Specifically, as shown in FIG. 10, each finger 124a-124g can include a substantially triangular head 125 and a thin and flat bridge 137 that connects the head 125 to the second side wall 174. Moreover, each head 125 includes a support surface 135a-135g, which faces away from the respective bridge 137.

The fingers 124a-124g can be resiliently flexible such that the fingers 124a-124g can resiliently move between an extended and a retracted position. FIG. 10 shows two fingers 124a, 124b that are disposed in the extended (neutral) position and a single finger 124c resiliently bent downward in the retracted position in the hollow space 129 defined between the side walls 172, 174, 176, 178. (The finger 124c is bent under the weight of the pane 112 as will be discussed.) Although only three of the fingers 124a-124c are shown in FIG. 10, it will be appreciated that all of the fingers 124a-124g can move between the extended and retracted positions.

As shown, when the fingers 124a, 124b are in the extended position, the heads 125a, 125b extend out of the hollow space 129 so that the support surfaces 135a, 135b are available for supporting the peripheral edge 113 of the pane 112. On the other hand, when the finger 124c is in the retracted position, the head 125c is disposed within the hollow space 129 and retracted away from the pane 112.

As shown in FIGS. 7 and 10, the support surfaces 135a-135g of the fingers 124a-124g can be disposed at different distances away from a reference surface 139 of the base member 128. For instance, the second side wall 174 can define the reference surface 139 in FIG. 10, and the support surface 135a of the first finger 124a can be disposed at a first distance D1 away from the reference surface 139 while the support surface 135b of the second finger 124b can be disposed at a second distance D2 from the reference surface 139. The second distance D2 can be approximately 0.75 millimeters greater than the first distance D1. In some embodiments, each of the support surfaces 135a-135g can be spaced apart from each other in equal increments (e.g., approximately 0.75 millimeter increments). As such, one or more of the support surfaces 135a-135g can be in position to support the pane 112 even if the pane 112 is shifted upwards or downwards relative to the trough 168 of the frame 114. In some embodiments, the position of the pane 112 relative to the trough 168 can vary across a +/−2.25 millimeter range, and one or more of the support surfaces 135a-135g will be available to support the peripheral edge 113 of the pane 112.

The support tool 116 can also include a plurality of magnets 126 (permanent magnets, electromagnets, etc.). The magnets 126 can be embedded within the base member 128 or otherwise attached to the base member 128. In the embodiments illustrated in FIG. 7, there are three magnets 126. As shown in FIG. 10, the magnets 126 are attached interiorly to the back panel 131.

FIGS. 8-10 show how the support tool 116 can be used. Although only one support tool 116 is shown for attaching the pane 112, it will be appreciated that a plurality of support tools 116 (e.g., two support tools 116 spaced apart across the bottom peripheral edge 113) can be used for installation.

To prepare for installation, the dimensions of the frame 114 can be measured. Then, the user can calculate a target position of the pane 112 in relation to the frame 114 (e.g., in the cross-vehicle direction and in the vertical direction). Next, the user can mark the frame 114 (e.g., with a metal scribing tool) to indicate where to place the support tool(s) 116 on the frame 114 in order to support the pane 112 in this target position. In additional embodiments, the frame 114 includes a preformed marking or indication where to place the support tool 116 such that the frame 114 need not be subsequently measured or marked. Then, the support tool 116 can be magnetically attached to the package tray 166, above the trough 168 in the intended locations on the frame 114.

Next, as shown in FIG. 9, the bead 122 of adhesive 120 can be applied to the pane 112, and the pane 112 can be moved toward the predetermined target position relative to the frame 114. In the embodiments shown in FIG. 10, when pane 112 is in the target position, the pane 112 overlaps the finger 124c; therefore, the pane 112 bends the finger 124c down toward the retracted position. Also, in the embodiments shown, the support surface 135a of the finger 124a is spaced away from the peripheral edge 113 of the pane 112; therefore, the finger 124a remains in the extended position, but the finger 124a does not support the pane 112. However, in the embodiments shown, the support surface 135b of the finger 124b is in position to abut the peripheral edge 113 of the pane 112 to thereby support the pane 112 in the vertical direction (e.g., to limit sagging of the pane 112).

It will be appreciated that if the pane 112 was disposed further downward (i.e., closer to the trough 168), the support surface 135a of the finger 124a could abut the peripheral edge 113 to support the pane 112. Also, if the pane 112 was disposed further upward (i.e., further from the trough 168), the support surface 135c of the finger 124c could abut the peripheral edge 113 to support the pane 112. Accordingly, this modularity of the support tool 116 can increase the usefulness of the support tool 116.

Once the bead 122 of adhesive 120 contacts the frame 114, pressure can be applied to the pane 112 toward the frame 114 to compress the bead 122. In some embodiments illustrated in FIG. 10, the base member 128 of the support tool 116 can have a thickness T that is approximately equal to the desired thickness T of the bead 122. Specifically, the combined thickness T of the back panel 131 and fourth side wall 178 can be approximately equal to the desired thickness T of the bead 122. As such, a support surface 127 defined on the fourth side wall 178 of the base member 128 can abut against the inner surface 115 of the pane 112 to support the pane 112 in the thickness direction, and the support surface 135*b* of the finger 124*b* can abut against the peripheral edge 113 to support the pane 112 in the vertical direction. Thus, both surfaces 127, 135*b* cooperate to support the pane 112 in position relative to the frame 114.

Once the adhesive 120 sufficiently cures, the support tool 116 can be pulled (e.g., by the flexible strap 141) to detach the support tool 116 from the frame 114. Thus, the support tool 116 can be used again to install another pane 112.

Like the support tool 16 illustrated in FIGS. 1-6, the support tool 116 of FIGS. 7-10 can facilitate installation of the pane 112 into its intended position relative to the frame 114. This is because the pane 112 can be installed without additional fasteners that need to be received within corresponding holes in the frame 114, etc. Also, the tool 116 can limit over-compression of the bead 122. Additionally, if several panes 112 are shipped together, the panes 112 can be packed closely together without having to include space for fasteners therebetween. Finally, the support tool 116 allows the pane 112 to be accurately fit and positioned relative to the frame 114, and as such, the pane 112 is unlikely to cause buzzing, rattling, squeaking, etc. while the vehicle is in motion.

What is claimed is:

1. An installation system for attaching a transparent pane to a frame, the installation system comprising:
    at least one support tool that includes:
        a base member defining a first frame abutting surface that extends in a first direction,
        a support member that is unitary with the base member, the support member defining a second frame abutting surface that extends in a second and different direction than the first frame abutting surface, the support member operable to support the pane in a fixed position relative to the frame,
        a handle member arranged parallel to the base member, the handle member being unitary with and connected to the base member by a stem such that the handle member is spaced apart from the base member, and
        a magnet that is fixed to at least one of the base member and the support member for magnetically and removably attaching the at least one support tool to the frame.

2. The installation system of claim 1, wherein the second frame abutting surface is defined by a flange that extends away from the base member, the flange including a pane abutting surface that is opposite to the second frame abutting surface, the pane abutting surface operable to abut against the pane and the second frame abutting surface operable to abut against the frame to thereby support the pane in the fixed position relative to the frame.

3. The installation system of claim 2, wherein the magnet is substantially embedded in the base member and is spaced away from the flange.

4. The installation system of claim 3, wherein the base member includes an opening that exposes the magnet.

5. The installation system of claim 1, wherein the at least one support tool includes a first support tool and a second support tool, further comprising a connection member that connects the first and second support tools, the connection member being flexible and allowing the support member of the first support tool to be disposed between a first edge of the pane and the frame and the support member of the second support tool to be disposed between a second edge of the pane and the frame, the first and second edges being disposed at a positive angle relative to each other.

6. The installation system of claim 1, further comprising a plurality of shim members operable to be disposed between the pane and the frame at respective locations that are spaced away from each other, the support member and the plurality of shim members operable to cooperatively support the pane in the fixed position relative to the frame.

7. The installation system of claim 6, wherein at least one of the plurality of shim members includes a first surface that adheres to the frame and a second surface that adheres to the pane.

8. The installation system of claim 6, wherein the pane is a pane for a vehicle defining a first direction, a second direction, and a third direction, the first, second, and third directions being orthogonal to each other, wherein the at least one support tool includes a first support tool and a second support tool, wherein the first support tool is operable to support the pane in a fixed position in the first direction, wherein the second support tool is operable to support the pane in a fixed position in the second direction, and wherein the plurality of shim members cooperate to support the pane in a fixed position in the third direction.

9. The installation system of claim 6, further comprising an adhesive from which a bead can be applied between the pane and the frame to attach the pane to the frame, the bead having a target thickness upon curing, the plurality of shim members each having a shim thickness approximately equal to the target thickness of the bead.

10. An installation system for attaching a transparent pane to a frame, the installation system comprising:
    at least one support tool that includes:
        a base member,
        a support member that is operably coupled to the base member, the support member operable to support the pane in a fixed position relative to the frame, and
        a magnet that is fixed to at least one of the base member and the support member for magnetically and removably attaching the at least one support tool to the frame,
    wherein the support member includes at least one finger that is moveably attached to the base member to move between an extended and a retracted position relative to the base member, the at least one finger operable to support the pane when the finger is in the extended position, the at least one finger retracted away from the pane when the finger is in the retracted position; and
    the support tool further includes a flexible strap unitary therewith that is operable to be pulled for removing the support tool from the frame.

11. The installation system of claim 10, wherein the at least one finger includes a first finger and a second finger, the first finger operable to support the pane in the extended position when the second finger is in the retracted position, and the second finger operable to support the pane in the extended position when the first finger is in the retracted position.

12. The installation system of claim 11, wherein the first finger includes a first support surface operable to support the pane and the second finger includes a second support surface operable to support the pane, wherein the base member includes a reference surface, wherein the first support surface is at a first distance from the reference surface and the second support surface is at a second distance from the reference surface, one of the first and second fingers being operable to support the pane when the pane is to be fixed in a first position relative to the frame, the other of the first and second fingers being operable to support the pane when the pane is to be fixed in a second position relative to the frame.

13. The installation system of claim 10, wherein the at least one finger and a base support surface of the base member are both operable to simultaneously abut and support the pane in the fixed position relative to the frame.

14. The installation system of claim 10, wherein the base member is substantially hollow and box shaped to define an inner space, the at least one finger moving into and out of the inner space when moving between the extended and retracted positions.

15. The installation system of claim 14, wherein the base member also includes a back panel that covers one end of the base member.

16. The installation system of claim 10, wherein the pane is a backlite of a vehicle having a bottom peripheral edge, the support member operable to support the bottom peripheral edge.

17. The installation system of claim 1, wherein the frame is at least partially made from ferromagnetic material, and the magnet is a permanent magnet.

\* \* \* \* \*